June 14, 1960  R. BLUMBERG ET AL  2,941,087
WIDTH MEASURING APPARATUS
Filed July 21, 1959  5 Sheets-Sheet 1
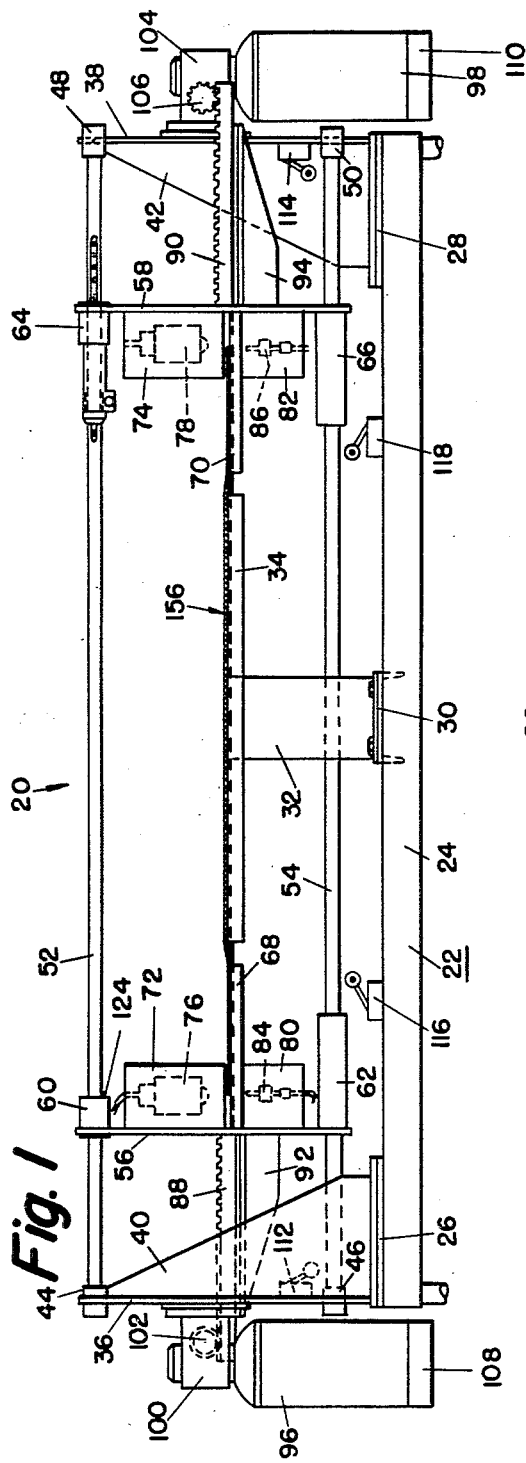
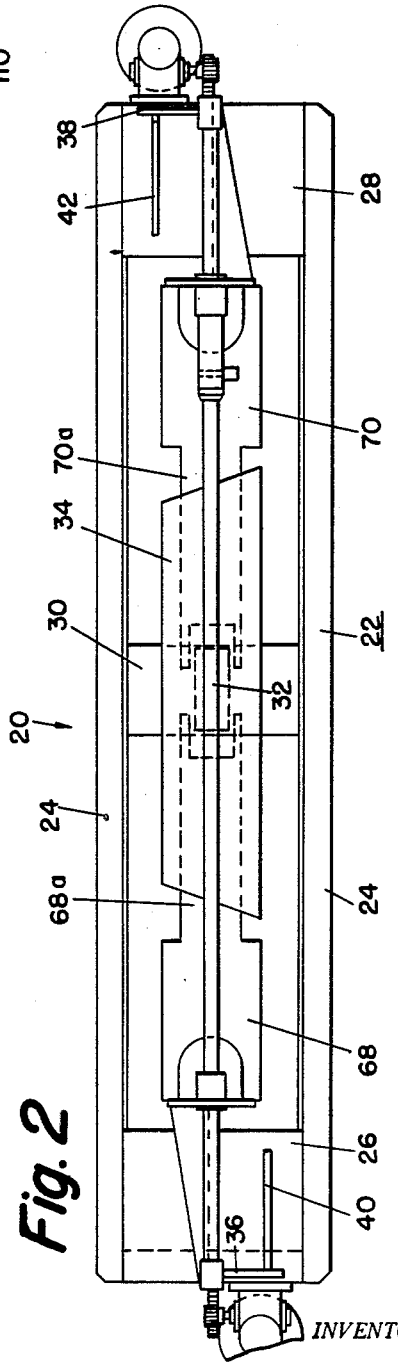
INVENTORS
RICHARD BLUMBERG
GEORGE MOORE
BY
Arthur H. Seidel
ATTORNEY June 14, 1960     R. BLUMBERG ET AL     2,941,087
WIDTH MEASURING APPARATUS
Filed July 21, 1959                             5 Sheets-Sheet 2
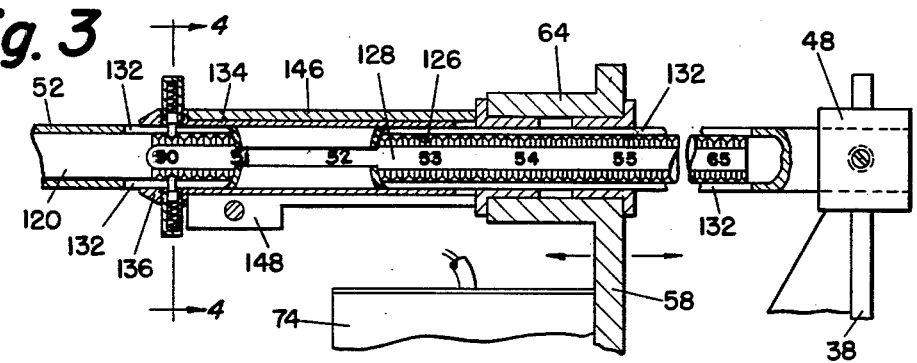
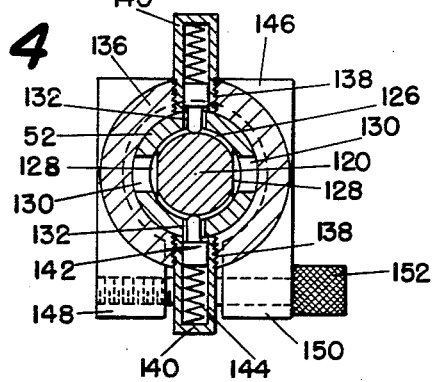
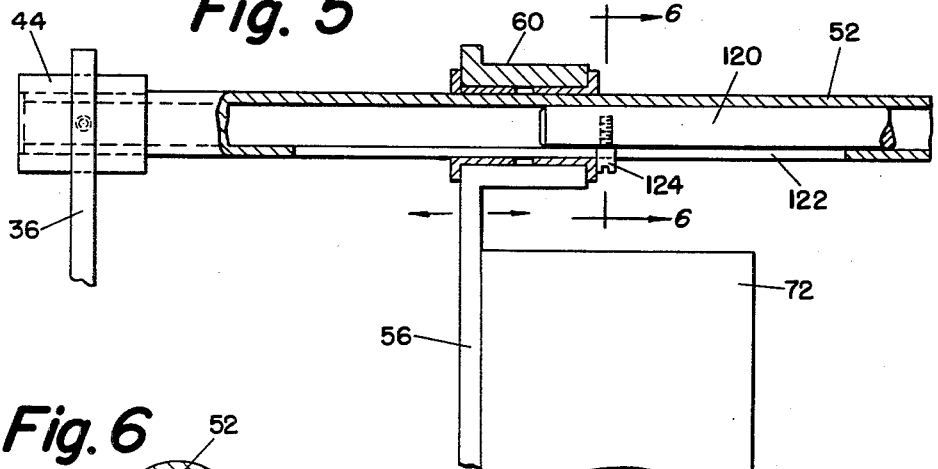
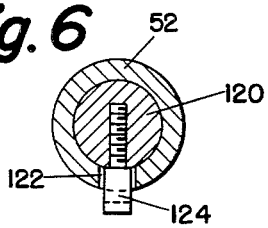
*INVENTORS*
RICHARD BLUMBERG
GEORGE MOORE
BY
*Arthur H. Seidel*
ATTORNEY June 14, 1960

R. BLUMBERG ET AL 2,941,087

WIDTH MEASURING APPARATUS

Filed July 21, 1959

INVENTORS
RICHARD BLUMBERG
GEORGE MOORE
BY

Arthur H. Seidel
ATTORNEY

June 14, 1960  R. BLUMBERG ET AL  2,941,087
WIDTH MEASURING APPARATUS
Filed July 21, 1959  5 Sheets-Sheet 4
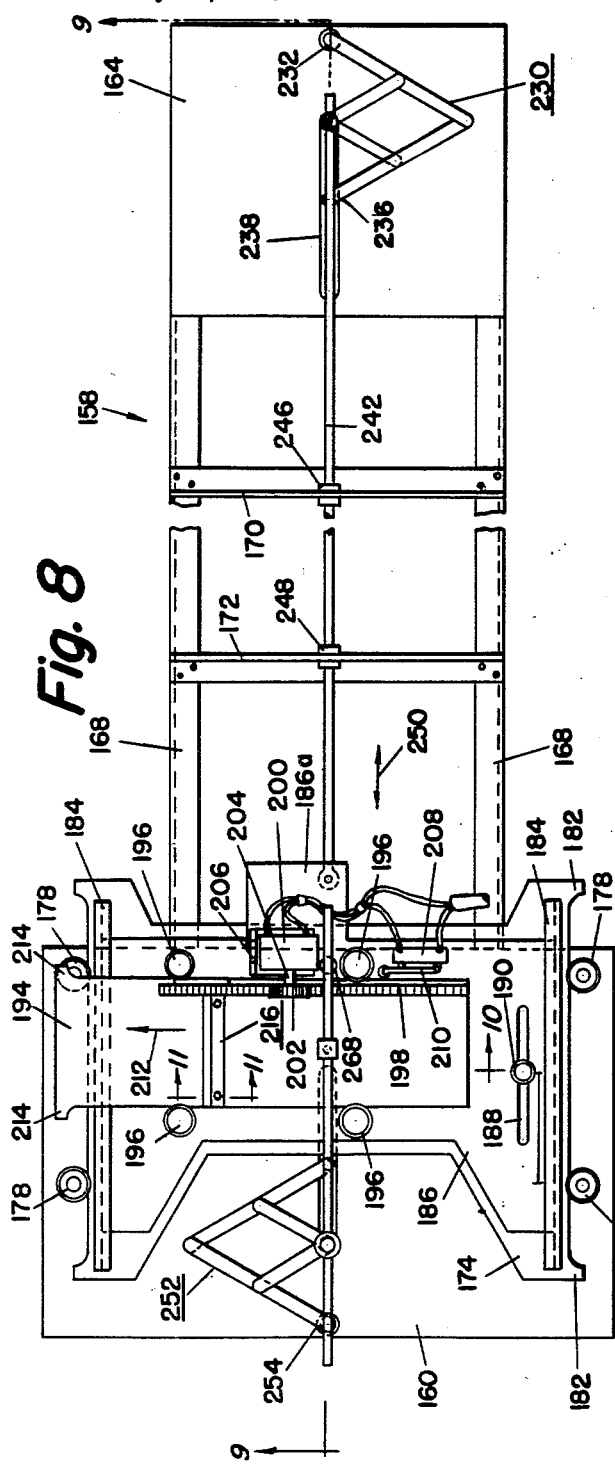
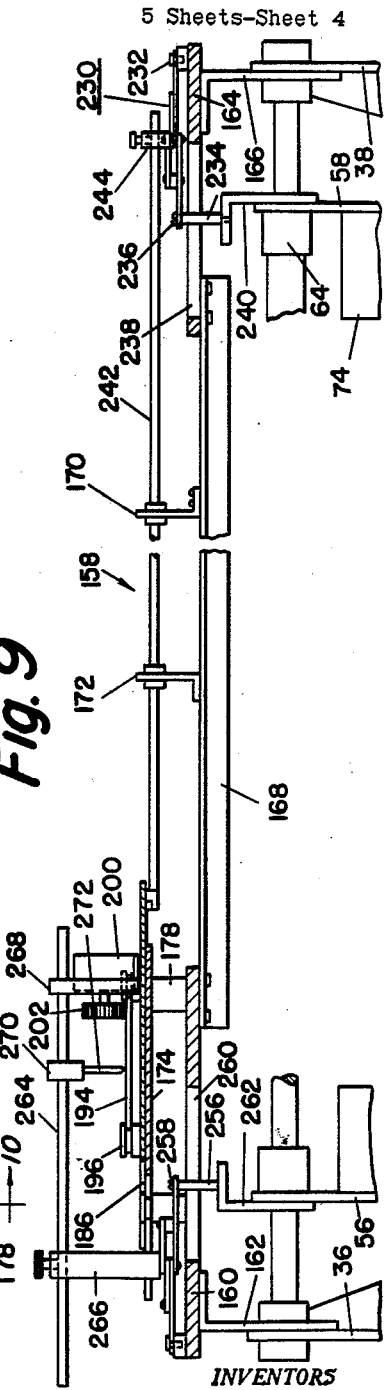
INVENTORS
RICHARD BLUMBERG
GEORGE MOORE
BY
Arthur H. Seidel
ATTORNEY

United States Patent Office 2,941,087
Patented June 14, 1960

2,941,087

WIDTH MEASURING APPARATUS

Richard Blumberg, 2123 Pershing Ave., Morton, Pa., and George Moore, 215 Holmes Road, Holmes, Pa.

Filed July 21, 1959, Ser. No. 828,569

12 Claims. (Cl. 250—219)

The present invention relates to a width measuring apparatus, and more particularly to an apparatus for continuously measuring and recording the width of an elongated sheet or web of material or the like.

When manufacturing or otherwise dealing with long sheets for webs of material in roll form, it is often desirable to measure the width of the sheet or web of material. Since the width of the web or sheet of material often varies along its length, it is often desirable to be able to determine the minimum width of the sheet or web. Also, it is often desirable to measure the width of such a sheet or web of material at uniformly spaced points along the length of the web or sheet to determine where any variations in the width of the material may occur.

The above desiderata is frequently encountered in the garment industry where it is necessary to divide a roll of goods into uniform lengths of uniform width. Thus, it is desirable to be able to quickly measure the entire length of the roll of goods to determine the minimum width of the goods on the roll, and preferably to determine at what point or points along the length of the roll of goods any variation in the width of the goods may take place.

It is an object of the present invention to provide an apparatus for measuring the width of a long sheet or web of material.

It is another object of the present invention to provide an apparatus for measuring the width of a long sheet or web of material, and recording the minimum width of the sheet or web.

It is a further object of the present invention to provide an apparatus for measuring the width of a long sheet or web of material at uniform points along the web or sheet, and recording the width of the sheet at each of the measured points.

Other objects will appear hereinafter.

For the purpose of illustrating the invention there is shown in the drawings forms which are presently preferred; it being understood, however, that this invention is not limited to the precise arrangements and instrumentalities shown.

Figure 1 is a front elevational view of the apparatus of the present invention.

Figure 2 is a top elevational view of the apparatus of the present invention.

Figure 3 is a sectional view, partly in elevation, of one end of the width recording means of the apparatus of the present invention.

Figure 4 is a sectional view taken along line 4—4 of Figure 3.

Figure 5 is a sectional view, partly in elevation, of the other end of the width recording means of the apparatus of the present invention.

Figure 6 is a sectional view taken along line 6—6 of Figure 5.

Figure 7 is a circuit diagram of the electrical circuit for operating the apparatus of the present invention.

Figure 8 is a top elevational view of a modification of a width recording device for use with the apparatus of the present invention.

Figure 9 is a sectional view taken along line 9—9 of Figure 8.

Figure 10:
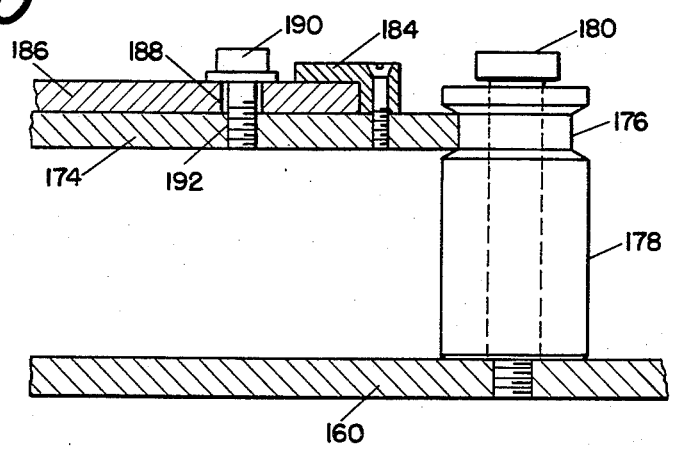
Figure 10 is a sectional view taken along line 10—10 of Figure 8.

Referring initially to Figures 1 and 2, the width measuring apparatus of the present invention is generally designated as 20.

Apparatus 20 comprises a horizontal base 22. Base 22 includes a pair of spaced, parallel rails 24 connected together at their ends by plates 26 and 28. The rails 24 are connected together intermediate their ends by a beam 30.

A rectangular post 32 is mounted in an upright position on the beam 30. The post 32 is positioned intermediate the rails 24, and intermediate the end plates 26 and 28. A horizontal table 34 is mounted on the post 32. Table 34 is positioned so that it is intermediate the ends of the base 22.

A pair of parallel mounting plates 36 and 38 are supported in an upright position on the base end plates 26 and 28 respectively by upright support plates 40 and 42 respectively. The mounting plates 36 and 38 are positioned adjacent the outer ends of the base end plates 26 and 28, and the support plates 40 and 42 are at right angles to the mounting plates 36 and 38 respectively. A pair of vertically spaced supporting collars 44 and 46 are mounted in alignment on the mounting plate 36. The axes of the supporting collars 44 and 46 are parallel to each other, and are perpendicular to the plane of the mounting plate 36. Supporting collar 44 is positioned adjacent the top of the mounting plate 36, and supporting collar 46 is positioned adjacent the bottom of the mounting plate 36. A pair of vertically spaced supporting collars 48 and 50 are mounted in alignment on the mounting plate 38. The axis of the supporting collar 48 is in horizontal alignment with the axis of the supporting collar 44 on the mounting plate 36. The axis of the supporting collar 50 on the mounting plate 38 is in horizontal alignment with the axis of the supporting collar 46 on the mounting plate 36. A supporting and guide tube 52 extends horizontally between the mounting plates 38 and 40 with the ends of the tube 52 being supported in the supporting collars 44 and 48. A supporting and guide tube 54 extends between the mounting plates 36 and 38, and the ends of the tube 54 are supported in the supporting collars 46 and 50.

A pair of vertical plates 56 and 58 are supported between the tubes 52 and 54 with the plate 56 being adjacent the mounting plate 36, and the plate 58 being adjacent the mounting plate 38. Plate 56 has a slide bearing 60 mounted at the top of the plate 56, with the bearing 60 surrounding the tube 52. Plate 56 has a slide bearing 62 adjacent the bottom of the plate 56, which bearing 62 is around the tube 54. Thus, the plate 56 is supported between the tubes 52 and 54, and can slide along the tubes 52 and 54. Plate 58 has slide bearings 64 and 66 adjacent the upper and lower ends of the plate 58. Bearing 64 is around the tube 52, and bearing 66 is around the tube 54. Thus, the plate 58 is supported between the tubes 52 and 54, and can slide along the tubes 52 and 54.

Tables 68 and 70 are secured to the inner surfaces of the plates 56 and 58 respectively. The tables 68 and 70 extend horizontally toward each other from the plates 56 and 58, and are in alignment with the stationary table 34. The top surfaces of the tables 68 and 70 are in vertical alignment with the bottom surface of the stationary table 34. The tables 68 and 70 have inner extensions 68a and 70a which extend beneath the stationary table 34. The inner ends of the table extensions 68a and 70a are grooved so that the inner ends of the extensions 68a and 70a fit around the post 32.

Housings 72 and 74 are mounted on the inner surfaces of the plates 56 and 58 respectively slightly above the tables 68 and 70. The housings 72 and 74 contain lamps 76 and 78 respectively which are arranged to shine a beam of light toward the tables 68 and 70. Housings 80 and 82 are mounted on the inner surfaces of the plates 56 and 58 respectively beneath the tables 68 and 70 and in vertical alignment with the lamp housings 72 and 74 respectively. The housings 80 and 82 contain photocells 84 and 86 which are positioned to receive the light from the lamps 76 and 78. The tables 68 and 70 have openings therethrough, not shown, to permit the light from the lamps 76 and 78 to be directed on the photocells 84 and 86.

Tooth racks 88 and 90 are secured to the outer surfaces of the plates 56 and 58 respectively. The racks 88 and 90 extend horizontally from the plates 56 and 58, and project beyond the mounting plates 36 and 38. The racks 88 and 90 are supported on brackets 92 and 94 respectively which are secured to the outer surfaces of the plates 56 and 58 respectively. Reversible electric motors 96 and 98 are mounted on the outer surfaces of the mounting plates 36 and 38 respectively. Motor 96 is drivingly connected through a speed reducing mechanism 100 to a gear 102. Gear 102 meshes with the teeth of the rack 88. Motor 98 is drivingly connected through a speed reducer mechanism 104 to a gear 106. Gear 106 meshes with the teeth of the rack 90. Thus, rotation of the motors 96 and 98 drives the racks 88 and 90 longitudinally to move the plates 56 and 58 toward or away from each other.

Motors 96 and 98 are provided with reversing switches 108 and 110 respectively which operate to reverse the direction of rotation of the motors 96 and 98. Switches 112 and 114 are mounted on the inner surfaces of the mounting plates 36 and 38 respectively. Switch 112 is connected to the motor 96 through the reversing switch 108 and switch 114 is connected to the motor 98 through the reversing switch 110. The switches 112 and 114 are adapted to be engaged by the movable plates 56 and 58 respectively to stop the movement of the plates 56 and 58 away from each other. Switches 116 and 118 are mounted on the base 22 adjacent the ends of the fixed table 34. Switch 116 is connected to the motor 96 through the reversing switch 108, and switch 118 is connected to the motor 98 through the reversing switch 110. Switches 116 and 118 are adapted to be engaged by the slide bearings 62 and 66 on the movable plates 56 and 58 to limit the movement of the plates 56 and 58 toward each other.

Referring to Figures 3–6, the means for indicating the width of the sheet or web being measured by the apparatus 20 of the present invention comprises an elongated rod 120 slidably disposed within the upper supporting and guide tube 52. Rod 120 is shorter than the length of the tube 52, but is longer than the widest sheet or web to be measured on the apparatus 20. As shown in Figure 5, tube 52 has a longitudinally extending slot 122 therethrough adjacent the end of the tube 52 which is mounted on the mounting plate 36. A pin 124 is threadably secured in the rod 120 adjacent the end of the rod 120 which is juxtaposed to the slide bearing 60 of the movable plate 56. Pin 124 projects through the slot 122 in the tube 52, and extends into the path of the movement of the slide bearing 60 along the tube 52. Thus, the pin 124 is adapted to be engaged by the inner end of the slide bearing 60 when the movable plate 56 is moved toward the movable plate 58.

As shown in Figure 3, the end of the rod 120 which is juxtaposed to the movable plate 58 is provided with a plurality of annular, V-shaped grooves 126, and a pair of diametrically opposed, longitudinally extending flat surfaces 128. The flat surfaces 128 are provided with longitudinally spaced indicia which indicates the width of the web or sheet being measured by the apparatus 20. The tube 52 is provided with a pair of diametrically opposed, longitudinally extending slots 130 therethrough which are in alignment with the flat surfaces 128 of the rod 120. Thus, the indicia on the flat surfaces 128 are visible through the slots 130 in the tube 52. Tube 52 is also provided with a pair of diametrically opposed, longitudinally extending slots 132 which are spaced between the slots 130.

A sleeve 134 is slidably disposed around the tube 52 adjacent the inner end of the slide bearing 64 of the movable plate 58. Sleeve 134 has an annular flange 136 on its end away from the slide bearing 64. Flange 136 has a pair of diametrically opposed holes 138 therethrough which are in alignment with the slots 132 in the tube 52. The holes 138 are threaded, and a separate cylindrical housing 140 is threaded into each of the holes 138. Each of the housings 140 contains a detent pin 142, and a spring 144 compressed between the bottom of the housings 140 and the detent pin 142. The detent pins 142 extend through the slots 132 in the tube 52, and the springs 144 hold the pins 142 in the grooves 126 in the rod 120. A split collar 146 is disposed around the sleeve 134 between the flange 136 and the slide bearing 164. Collar 146 has a pair of flanges 148 and 150 extending radially from the edges of the split. A headed bolt 152 extends through the flange 150, and is threaded through the flange 148 to clamp the collar 146 tightly around the sleeve 134.

As shown in Figure 7, the lamps 76 and 78 are connected across a source of electrical current to light the lamps 76 and 78. The motors 96 and 98 are connected through the reversing switches 108 and 110 respectively to the source of electrical current to operate the motors 96 and 98. The photocells 84 and 86 are connected to the motors 96 and 98 respectively through a control relay system 154 and the reversing switches 108 and 110 respectively. When the photocells 84 and 86 receive the light from the lamps 76 and 78, the control relays 154 operate to permit the operation of the motors 96 and 98 respectively. However, when the light to the photocells 84 and 86 is cut off, the control relays 154 operate to stop the operation of the respective motors 96 and 98. The switches 112 and 114 are connected to the motors 96 and 98 respectively through the control relay system 154 and the respective reversing switches 108 and 110. Likewise, the switches 116 and 118 are connected to the motors 96 and 98 respectively through the control relay system 154 and the reversing switches 108 and 110 respectively.

The operation of the apparatus 20 of the present invention is as follows:

At the start of the operation of the apparatus 20, the plate 56 with the lamp 76 and photocell 84 is positioned adjacent the mounting plate 36, and the plate 58 with the lamp 78 and the photocell 86 is positioned adjacent the mounting plate 38. The lamps 76 and 78 are turned on to direct beams of light onto the photocells 84 and 86 respectively, and thereby permit the operation of the motors 96 and 98. The end of the web or sheet of the material 156 from a roll of the material is placed on the fixed table 34 and the movable tables 68 and 70 as shown in Figure 1.

The motors 96 and 98 are then operated to rotate in a direction to move the plates 56 and 58 toward each other. The plate 56 moves toward the plate 58 until the side edge of the web of material 156 passes between the lamp 76 and the photocell 84. This breaks the light to the photocell 84, and causes the control relays 154 to stop the motor 96. As the plate 56 moves toward the plate 58, the slide bearing 60 of the plate 56 engages the pin 124 extending from the rod 120, and pushes the pin 124 and the rod 120 along with the plate 56 toward the plate 58.

The plate 58 moves toward the plate 56 until the side edge of the material 156 extends between the lamp 78 and the photocell 86. This breaks the beam of light to the photocell 86, and operates the control relays 154 to stop the operation of the motor 98. As the plate 58 moves toward the plate 56, the slide bearing 64 of the plate 58 engages the end of the collar 146 to move the collar 146 and the sleeve 134 along with the plate 58 toward the plate 56. Since the plates 56 and 58 are moving toward each other at the same time, the rod 120 and the sleeve 134 are simultaneously moved with respect to each other in opposite directions. Thus, as the sleeve 134 is moved over the rod 120, the detent pins 142 of the sleeve 134 move in and out as they are forced over the ridges between the grooves 126 in the rod 120.

When the breaking of the light to both of the photocells 84 and 86 has caused both motors 96 and 98 to stop, thereby stopping the movement of both the plate 56 and the plate 58, the control relays 154 operate to operate the reversing switches 108 and 110. The reversing switches 108 and 110 reverse the direction of rotation of the motors 96 and 98, and thereby move the plates 56 and 58 away from each other. Plate 56 moves toward the mounting plate 36 until the plate 56 engages the switch 112 which stops the motor 96. Plate 58 moves toward the mounting plate 38 until the plate 58 engages the switch 114 which stops the operation of the motor 98. When the plates 56 and 58 move away from each other, the rod 120 and the sleeve 134 remain at their innermost position. The indicia on the flat surfaces 128 of the rod 120 is calibrated so that the number indicated by the end of the flange 136 of the sleeve 134 as viewed through the slot 130 in the tube 52 is the width of the web of material 156 at the point of measurement.

When both of the switches 112 and 114 are engaged by the plates 56 and 58 to stop both of the motors 96 and 98, the control relay system 154 operates to operate the reversing switches 108 and 110. This reverses the direction of rotation of the motors 96 and 98 so that the plates 56 and 58 are again moved toward each other. The plates 56 and 58 move toward each other until the side edges of the material 156 break the light to the photocells 84 and 86 to stop the motors 96 and 98, and to reverse the direction of rotation of the motors 96 and 98. Thus, the plates 56 and 58 continuously move toward each other until both of the photocells 84 and 86 sense the edges of the material 156, and then both of the plates 56 and 58 move away from each other until both of the switches 112 and 114 are operated.

As the plates 56 and 58 move toward and away from each other, the sheet or web of material 156 is drawn across the fixed table 34 and movable tables 68 and 70 in a direction perpendicular to the direction of movement of the plates 56 and 58. Thus, each time that the photocells 84 and 86 sense the side edges of the material 156, the apparatus 20 measures the width of the material 156 at a different point along the length of the material. If at any point of measurement of the material 156, the material is of a width less than the previously measured widths of the material 156, the plates 56 and 58 will move closer together before the photocells 84 and 86 sense the side edges of the material 156. This will cause the slide bearings 60 and 64 to engage the pin 124 and the collar 146 respectively to move the rod 120 and the sleeve 134 with respect to each other. Thus, the end of the flange 136 of the sleeve 134 will indicate a smaller number on the flat surfaces 128 on the rod 120, which number corresponds to the smaller width of the material 156.

Thus, as the entire length of the roll of the material 156 is moved through the apparatus 20, the width of the material 156 is measured at a number of spaced points along the length of the material 156, and the minimum width measured is indicated on the rod 120 by the end of the flange 136 of the sleeve 134.

As the web of material 156 is moved across the table 34, it is possible that the material 156 will not be fed in a straight line, but may move sideways. If the material 156 moves to the right as viewed in Figure 1, the photocell 86 will sense the edge of the material 156 first, and will stop the movement of the plate 58. The plate 56 will have to move further toward the plate 58 than it moved during the previous cycle before the photocell 84 will sense the edge of the material 156. Thus, the slide bearing 60 of the plate 56 will engage the pin 124 to move the rod 120 from its previous position. However, since the slide bearing 64 of the plate 58 has not moved inwardly a distance to engage the collar 146, the movement of the rod 120 will also move the sleeve 134 in the same direction as the rod 120 to the engagement of the detent pins 142 in the grooves 126. The sleeve 134 will move with the rod 120 until the collar 146 engages the slide bearing 64. Since the width of the material 156 is the same as the previously measured width, the spacing between the plates 56 and 58 will be the same so that the rod 120 and sleeve 134 will not be moved with respect to each other. However, if the width of the material 156 is less than the widths previously measured, the plate 56 will be closer to the plate 58 than during the previous measurement, and the rod 120 will be moved with respect to the sleeve 134 to indicate the narrower measurement. If the web of material 156 moves to the left as viewed in Figure 1, the photocell 84 will sense the edge of the material 156 first to stop the movement of the plate 56. The plate 58 will then move further inwardly before the photocell 86 senses the edge of the material 156. The slide bearing 64 of the plate 58 will then move both the sleeve 134 and the rod 120 in the same direction until the pin 124 engages the slide bearing 60 of the plate 56. Thus, even though the web of material 156 may move from side to side, the apparatus 20 of the present invention will accurately measure the width of the material.

Many materials, such as cloth fabrics, have a selvage edge along each side which cannot be used. Therefore, when measuring such cloth fabrics, it is desirable to compensate for the selvage edge. To compensate for such selvage edges, the bolt 152 of the collar 146 is unthreaded to loosen the engagement between the collar 146 and the sleeve 134. The sleeve 134 is then moved longitudinally with respect to the collar 146 until the end of the collar 146 is spaced from the flange 136 of the sleeve 134 a distance equal to the width of the selvage edges. The bolt 152 is then threaded back in to tighten the collar 146 around the sleeve 134. By moving the flange 136 of the sleeve 134 away from the end of the collar 146, the collar 146 will indicate a smaller number on the flat surfaces 128 of the rod 120, which number is smaller by an amount equal to the width of the selvage edges. If desired, the outer surface of the sleeve 134 can be provided with indicia to indicate various widths of selvage edges to facilitate the proper setting of the sleeve 134 with respect to the collar 146.

Referring to Figures 8 and 9, a modification of the width recording device for use with the apparatus 20 of the present invention is generally designated as 158. Recording device 158 records the width of the material 156 at each measured point along the length of the material 156.

Recording device 158 comprises a horizontal shelf 160 mounted above the mounting plate 36 on a bracket 162, and a shelf 164 mounted above the mounting plate 38 on a bracket 166. A pair of spaced, parallel rods 168 are secured between the shelf 160 and the shelf 164. A pair of brackets 170 and 172 are secured between the rods 168.

A horizontal bottom plate 174 is mounted on the shelf 160 for movement with respect to the shelf 160 toward and away from the shelf 164. The side edges of the bottom plate 174 are supported in annular grooves 176 in the periphery of the rollers 178. Rollers 178 are rotatably mounted on vertical spindles 180 which are secured to the shelf 160. Bottom plate 174 is provided with flanges 182 which limit the movement of the bottom plate 174 by engaging the rollers 178. Bottom plate 174 has a pair of parallel guide tracks 184 secured to the top surface of the bottom plate 174, and extending along the side edges of the bottom plate 174. A top plate 186 is seated on the bottom plate 174 with the side edges of the top plate 186 extending under the guide tracks 184. Top plate 186 has an elongated hole 188 therethrough, which hole 188 is parallel to the guide tracks 184. A headed bolt 190 extends through the elongated hole 188 in the top plate 186, and is threaded in a hole 192 in the bottom plate 174 (see Figure 10). By loosening the bolt 190, the top plate 186 can be moved with respect to the bottom plate 174, and by tightening the bolt 190 against the top plate 186, the top plate 186 is secured to the bottom plate 174.

A recording card carrying plate 194 is mounted on the top plate 186 for horizontal movement along a path which is perpendicular to the path of the movement of the bottom plate 174 and the top plate 186. Card carrying plate 194 is supported on rollers 196. The rollers 196 are rotatably mounted on the top plate 186 for rotation about vertical axes. A tooth rack 198 is secured to the top surface of the card carrying plate 194. The rack 198 extends along the side edge of the card carrying plate 194 in the direction of the movement of the plate 194. An electric motor 200 is mounted on the top plate 186 adjacent the card carrying plate 194. A gear 202 on the shaft 204 of the motor 200 is adapted to mesh with the teeth of the rack 198 to drive the card carrying plate 194. The base of the motor 200 is secured to the top plate 186 by a hinge 206. Thus, the motor 200 can be pivoted to move the gear 202 away from or toward the rack 198.

An electric switch 208 is mounted on the top plate 186, and is connected in the circuit between the electric motor 200 and the source of electric current for the motor 200. The actuating arm 210 of the switch 208 engages the side edge of the card carrying plate 194 to maintain the switch 208 closed. However, when the card carrying plate 194 moves far enough in the direction of arrow 212 to pass the switch actuating arm 210, the switch 208 is opened to stop the operation of the motor 200. Thus, the switch 208 limits the movement of the card carrying plate 194 in one direction. Card carrying plate 194 has a pair of flanges 214 which are adapted to engage the rollers 196 to limit the movement of the card carrying plate 194 in the other direction.

Figure 11:
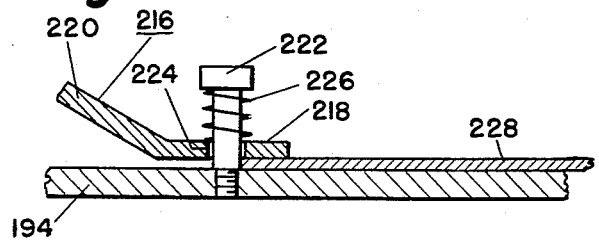
Figure 11 is a sectional view taken along line 11—11 of Figure 8.

A card clamp 216 extends across the card carrying plate 194 substantially perpendicular to the rack 198. As shown in Figure 11, the card clamp 216 comprises a base strip 218 which is seated on the card carrying plate 194, and a flange 220 extending upwardly from the edge of the base 218. A pair of headed bolts 222 extend through holes 224 in the base 218 of the card clamp 216, and are threaded into the card carrying plate 194. Helical springs 226 extend around the bolts 222, and are compressed between the heads of the bolts 222 and the base 218 of the card clamp 216. Thus, the springs 226 hold the base 218 of the card clamp 216 tightly against the card carrying plate 194. To secure a recording card, such as the card 228 shown in Figure 12, to the card carrying plate 194, the flange 220 of the card clamp 216 is pressed down to lift the base 218 upwardly. The edge of the card 228 is then inserted under the base 218 of the clamp 216, and the flange 220 is released. The springs 226 press the base 218 against the card 228 to hold the card 228 on the card carrying plate 194.

A pantograph 230 is mounted on the shelf 164. The free end 232 of the pantograph 230 is pivotally secured to the shelf 164. A vertical rod 234 is secured to the other free end 236 of the pantograph 230. The rod 234 extends downwardly from the end 236 of the pantograph 230, and projects through an elongated slot 238 in the shelf 164. The bottom end of the rod 234 is secured to a bracket 240 which is mounted on the top end of the moveable plate 58 of the width measuring apparatus 20. A horizontally extending rod 242 is secured at one end to the midpoint of the pantograph 230 by a clamp 244. The other end of the rod 242 is pivotally connected to a flange 186a extending from the top plate 186. The rod 242 is slidably supported intermediate its ends by bearings 246 and 248 mounted on the brackets 170 and 172 respectively. Thus, as the moveable plate 58 of the width measuring apparatus 20 moves back and forth, the rod 242 will be moved back and forth through the pantograph 230. The rod 242 will drive the bottom plate 174, top plate 186, and card carrying plate 194 back and forth in the direction of the double headed arrow 250 in Figure 8. Thus, the card carrying plate 194 is moved simultaneously with the moveable plate 58 and in the same direction as the moveable plate 58. However, the card carrying plate 194 will move a smaller distance than the moveable plate 58 depending on the reduction ratio of the pantograph 230.

A pantograph 252 is mounted on the shelf 160. The free end 254 of the pantograph 252 is pivotally secured to the shelf 160. A vertical rod 256 is secured to the other free end 258 of the pantograph 252. Rod 256 extends downwardly from the free end 258 of the pantograph 252, and projects through an elongated slot 260 in the shelf 160. The bottom end of the rod 256 is secured to a bracket 262 which is mounted on the top of the moveable plate 56 of the width measuring apparatus 20. A horizontal rod 264 is secured at one end to a midpoint of the pantograph 252 by a clamp 266. The rod 264 extends across the card carrying plate 194, and is parallel to the rod 242. The free end of the rod 264 is slidably supported in a post 268 mounted on the top plate 186. A marking pencil carrier 270 is supported on the rod 264, and a marking pencil 272 extends vertically downwardly from the carrier 270. The marking pencil 272 is positioned over the card carrying plate 194, and the point of the marking pencil 272 contacts the top surface of the card carrying plate 194. Thus, as the moveable plate 56 of the width measuring apparatus moves back and forth, it moves the marking pencil 272 back and forth in the same direction as the movement of the moveable plate 56. However, the stroke of the movement of the pencil 272 will be less than that of the moveable plate 56 by an amount corresponding to the reduction ratio of the pantograph 252.

Figure 12:
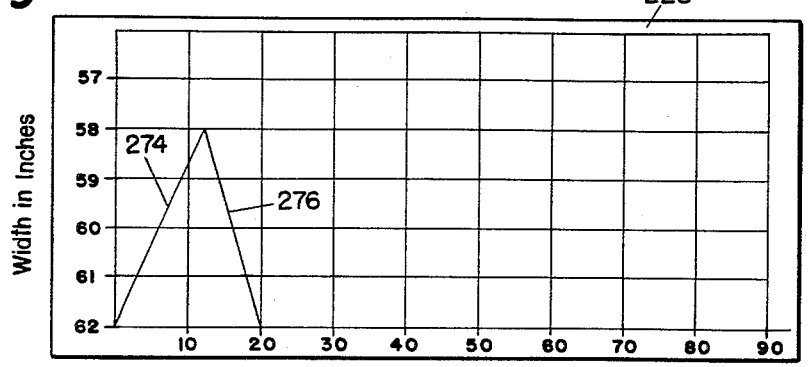
Figure 12 is a plan view of the recording card which is used with the recording device shown in Figure 8.

The operation of the recording device 158 for recording the width of a web of material measured by the apparatus 20 is as follows:

A recording card 228 is placed on the card carrying plate 194, and is clamped at one end to the card carrying plate 194 by the card clamp 216. As shown in Figure 12, the recording card 228 has a graph thereon with one axis of the graph representing the width of the sheet or web of material being measured, and the other axis of the graph representing the length of the sheet or web of material. The length axis of the graph is calibrated from zero to the maximum length of the sheet or web of material, whereas the width axis is calibrated to cover only a few inches on both sides of the nominal width of the sheet or web of material. Since a sheet or web of material normally varies in width only by a few inches, the width axis of the graph need only cover a few inches on both sides of the nominal width of the sheet or web. Thus, the recording card 228 can be made small, and will still accurately record the width of the sheet or web of material. The recording card 228 is mounted on the card carrying plate 194 with the width axis of the graph extending parallel to the card clamp 216, and the length axis of the graph extending parallel to the rack 198. The zero end of the length axis of the graph is placed adjacent the card clamp 216.

With the recording card 228 clamped in position on the card carrying plate 194, the motor 200 is pivoted upwardly to lift the gear 202 from the rack 198. The card carrying plate 194 is then pushed in the direction opposite to the arrow 212 until the zero end of the length axis of the graph on the recording card 228 is under the marking pencil 272. The motor 200 is then pivoted back down to move the gear 202 back into engagement with the rack 198.

As previously described, at the start of the operation of the width measuring apparatus 20, the moveable plates 56 and 58 are back adjacent the mounting plates 36 and 38 respectively. Thus, at the start of the operation of the width measuring apparatus 20 the marking pencil 272 is back at its closest position to the fixed end 254 of the pantograph 252, and the card carrying plate 194 is back at its closest position to the fixed end 232 of the pantograph 230. Thus, the marking pencil 272 is positioned adjacent the left side of the card carrying plate 194 as viewed in Figure 8. During the operation of the width measuring apparatus 20, as the moveable plates 56 and 58 move toward each other, the marking pencil 272 is moved to the right as viewed in Figure 8, and the card carrying plate 194 is moved to the left. At the same time that the motors 96 and 98 are turned on to move the plates 56 and 58 toward each other, the motor 200 is turned on to move the card carrying plate 194 in the direction of the arrow 212. The motor 200 is operated at a speed corresponding to but slower than the speed of the movement of the sheet or web of material 156 across the table 34 of the width measuring apparatus 20.

Thus, as the moveable plates 56 and 58 move toward each other, the marking pencil 272 and the card supporting plate 194 move in opposite directions with respect to each other, and the card supporting plate 194 also moves in the direction of the arrow 212. Thus, the marking pencil 272 moves across the recording card 228 to form the line 274 on the card 228 (see Figure 12). The marking pencil 272 draws the line 274 across the card 228 until the photocells 84 and 86 sense the edges of the material 156, and stop the inward movement of the plates 56 and 58. When the motors 96 and 98 are reversed, and move the plates 56 and 58 away from each other, the marking pencil 272 is moved back across the recording card 228 to provide the line 276. The peak provided by the lines 274 and 276 on the recording card 228 indicates the width of the sheet or web of material 156 at the point of the measurement, and also the point along the length of the material 156 that the measurement was made.

As the plates 56 and 58 move toward and away from each other to measure the width of the material 156 at various points along the length of the material 156, the marking pencil 272 is moved back and forth across the recording card 228 to provide a series of lines similar to the lines 274 and 276. The peak formed by the junction of each pair of such lines indicates along the width axis the width of the material 156 at the point of measurement, and along the length axis the point along the length of the material 156 that the measurement was made. Thus, when the entire length of the roll of the sheet or web of material 156 has been measured, the recording card 228 will have a large number of peaks recorded thereon which will indicate any variation in the width of the material 156. Thus, from the completed recording card 228 the exact location of any section of the material 156 which may vary in width can be located so that the section can be removed from the roll of the material if desired.

Since the recording device 158 records only variations from a nominal width of only a few inches, if consecutive rolls of materials having nominal widths which are substantially different, it is necessary to adjust the position of the card carrying plate 194 with respect to the marking pencil 272 to accommodate the material of a different width. To adjust the position of the card carrying plate 194 with respect to the marking pencil 272, the bolt 190 is loosened to permit the top plate 186 to be moved with respect to the bottom plate 174. If the second roll of material is narrower than the first roll, the moveable plates 56 and 58 will have to move closer together to measure the width of the second roll. Since the moveable plates 56 and 58 will have to move closer together, the marking pencil may be carried past the recording card 228 and against the rack 198. To prevent this, the top plate 186 is moved to the right as viewed in Figure 8 with respect to the bottom plate 174. If the second roll of material is wider than the previous roll, the top plate 186 is moved to the left with respect to the bottom plate 174. When the top plate 186 is properly positioned with respect to the bottom plate 174, the bolt 190 is again tightened against the top plate 186 to secure the top plate 186 to the bottom plate 174. If desired, the elongated hole 188 in the top plate 186 may be provided with indicia marks to facilitate the proper positioning of the top plate 186 with respect to the bottom plate 174 for any particular nominal width of material.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for measuring the width of a sheet or web of material comprising a table across which the material is moved, a pair of plates supported on opposite sides of said table for movement toward and away from said table, a separate source of light mounted on each of said plates, a separate photocell mounted on each of said plates and adapted to receive the light from the light source, the light source and photocell on each of said plates being positioned so that the side edge of the material passes between the light source and the photocell when the plates move toward the table, separate means for moving each of said plates toward and away from said table, the photocell on each of said plates being operatively connected to the means for moving the plate so that when the light to the photocell is interrupted by the edge of the material the inward movement of the plate is stopped, and means operated by said plates for measuring the distance between said plates at their innermost stopped position.

2. Apparatus in accordance with claim 1 in which the photocells are operatively connected to the means for moving the plates so that when the inward movement of both of said plates is stopped the plate moving means moves the plate outwardly away from the table, and separate means operatively connected to each of said plate moving means and operated by the plates for limiting the outward movement of said plates and for reversing the movement of said plates when both of said plates reach their outward limit.

3. Apparatus for measuring the width of a sheet or web of material comprising a base, a table mounted on said base, a pair of upright mounting plates supported on said base on opposite sides of said table, a pair of vertically spaced parallel guide rods connected between said mounting plates, a pair of plates slidably supported between said guide rods on opposite sides of said table for movement along said guide rods, a separate source of light mounted on the inner surface of each of said plates, a separate photocell mounted on the inner surface of each of said plates and adapted to receive the light from the light source, the light source and photocell on each of said plates being positioned so that the side edge of the material passes between the light source and the photocell when the plates move toward the table, separate means for moving each of said plates toward and away from said table, the photocell on each of said plates being operatively connected to the means for moving the plate so that when the light to the photocell is interrupted by the edge of the material the inward movement of the plate is stopped, and means operated by said plate for measuring the distance between said plates at their innermost stopped position.

4. Apparatus in accordance with claim 3 including a separate rack secured to and extending from the rear surface of each of the plates toward the adjacent mounting plate, and the means for moving said plates comprises a separate reversible electric motor mounted on each of said mounting plates, and a gear on the output shaft of each of said motors and meshing with the teeth on the rack of the adjacent plate.

5. Apparatus in accordance with claim 4 in which the photocells are operatively connected to the motors so that when the inward movement of both of the plates is stopped the motors are reversed to move the plates outwardly away from the table, and a separate switch means mounted on each of the mounting plates, said switch means being engaged by said plates and operatively connected to said motors to limit the outward movement of said plates and to reverse said motors when both of said plates have reached their outward limit.

6. Apparatus in accordance with claim 3 including a separate table attached to each of said movable plates and extending toward the fixed table in substantial alignment with said fixed table, said movable tables being positioned between the light source and the photocells and having an opening therethrough to permit the light from the light source to pass to the photocells.

7. Apparatus in accordance with claim 3 in which the uppermost guide rod is hollow and the means for measuring the distance between the movable plates comprises a rod slidably disposed within said hollow guide rod, a pin extending radially from adjacent one end of said rod and projecting through an elongated slot in said guide rod, said pin being engageable by the adjacent movable plate upon inward movement of said plate, indicia means longitudinally spaced along the other end of said rod for indicating the width of the material, an elongated slot in said guide rod exposing the indicia means to view, and a sleeve slidably disposed around said guide rod adjacent the other end of said rod, said sleeve being engageable by the adjacent movable plate upon inward movement of said plate, the indicia on said rod being calibrated so that an end of said sleeve indicates on said rod the width of the material.

8. Apparatus in accordance with claim 7 in which the rod is provided with a plurality of annular grooves longitudinally spaced along its end which is within the sleeve, and said sleeve is provided with a spring pressed detent pin extending through an elongated slot in the guide rod and engageable in said grooves.

9. Apparatus in accordance with claim 8 including a longitudinally split collar surrounding said sleeve, and means releasably clamping said collar tightly around said sleeve.

10. Apparatus in accordance with claim 3 in which the means for measuring the distance between the movable plates comprises a separate horizontal shelf secured to the top of each of the mounting plates, a plate slidably mounted on one of said shelves for movement in the same direction as the movable plates, a card holding plate slidably mounted on said plate for movement perpendicular to the movement of the plate, means for moving said card holding plate with respect to said plate, a pantograph mounted on said one shelf, one free end of said pantograph being pivotally secured to said one shelf, the other free end of said pantograph being connected to an adjacent movable plate, a marking pencil mounted above the card holding plate and secured to a central point of said pantograph, a second pantograph mounted on the other shelf, one end of said second pantograph being pivotally secured to said other shelf, the other end of said second pantograph being connected to an adjacent movable plate, and a horizontal rod connected between a central point of said second pantograph and the plate on said one shelf.

11. Apparatus in accordance with claim 10 in which the means for moving the card holding plate comprises a motor carried by the plates supporting the card holding plate, a gear on the output shaft of the motor, and a rack secured along the card holding plate, said gear being adapted to mesh with said rack.

12. Apparatus in accordance with claim 10 including a second plate disposed between the plate on the one shelf and the card holding plate, said second plate being slidable with respect to the first plate in the direction of the movement of the movable plates, and means for releasably securing said second plate to said first plate.

References Cited in the file of this patent

UNITED STATES PATENTS

| | | |
|---|---|---|
| 2,514,985 | Banner | July 11, 1950 |
| 2,548,590 | Cook | Apr. 10, 1951 |
| 2,730,006 | Gottschall | Jan. 10, 1956 |
| 2,810,316 | Snyder | Oct. 22, 1957 |